United States Patent Office 3,365,486
Patented Jan. 23, 1968

3,365,486
PROCESS FOR THE MANUFACTURE OF OLEFIN-
ICALLY UNSATURATED HYDROCARBON ES-
TERS OF PROPIONIC ACID
James E. McKeon and Paul S. Starcher, Charleston,
W. Va., assignors to Union Carbide Corporation, a
corporation of New York
No Drawing. Continuation of application Ser. No. 333,-
733, Dec. 26, 1963. This application June 24, 1966, Ser.
No. 560,347
The portion of the term of the patent subsequent to
Mar. 1, 1983, has been disclaimed
8 Claims. (Cl. 260—497)

This application is a continuation of copending application Ser. No. 333,733, filed Dec. 26, 1963, by J. E. McKeon and P. S. Starcher, now abandoned, said continuation application in turn being a continuation-in-part of copending application Ser. No. 182,688, filed Mar. 26, 1962, by J. E. McKeon and P. S. Starcher, now U.S. Patent No. 3,221,045, all of the aforesaid applications being assigned to a common assignee.

This invention relates to compositions and processes for the manufacture of olefinically unsaturated organic esters of propionic acid. More particularly, this invention is directed to processes and compositions, effective in the absence of halogen ions, for the manufacture of a variety of these propionates.

There is described in co-pending application Ser. No. 182,688, filed Mar. 26, 1962 now U.S. Patent No. 3,221,045, a process for the manufacture of a variety of unsaturated esters of carboxylic acids utilizing, e.g., an olefin, a monocarboxylic acid, a catalyst which is a reducible metal compound capable of possessing an oxidation state while complexed with the olefinic compound, and a metal co-oxidant in the higher of at least two potential oxidation states. By virtue of the oxidative capabilities of the co-oxidant to convert the catalyst to the aforedescribed oxidation state, it is possible to effect continuous production of alkenyl carboxylates. A significant and desirable aspect of the process of the co-pending application resides in producing the desired product in a homogeneous liquid phase system.

In co-pending application Ser. No. 280,534, filed May 15, 1963 now U.S. Patent No. 3,238,247, there is described a specific process for the manufacture of olefinically unsaturated acetate. The process described in said application allows for increased productivity of, e.g., alkenyl acetate by the addition of lithium acetate, potassium acetate, or mixtures of both to the reaction system. As before, the most desirable embodiment involves operating in a homogeneous liquid phase medium.

The process of this invention provides significantly enhanced productivity and rates of production of olefinically unsaturated esters of propionic acid. This is achieved by the liquid intermixture of propionic acid, and olefinically unsaturated organic compound (particularly an olefinically unsaturated hydrocarbon), a precious metal containing catalyst and a Cu(II) co-oxidant therefor, and the sodium and/or lithium salts of propionic acid.

The mechanism of the reaction to form the propionate is obviously complex and many theories can be advanced as explanations. One theory for the reaction mechanism is the following, where for purposes of illustration, the olefinically unsaturated compound is ethylene, the catalyst is palladium(II)propionate, and the co-oxidant is copper(II)propionate:

Ethylene forms a π-complex with Pd(II), such as,

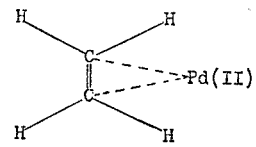

The presence of propionate ion with the π-complex causes formation of a palladium alkyl such as

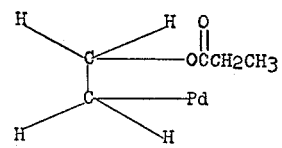

By virtue of abstraction of a proton by additional propionate ion there results vinyl propionate and Pd(O), e.g.,

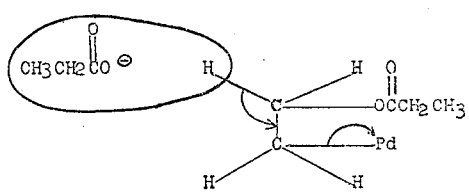

The primary reaction described above is characterized by reaction I:

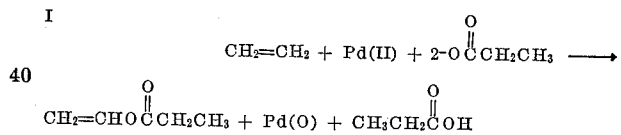

Palladium(O), formed in reaction I, is instantly oxidized to its covalent state by the co-oxidant Cu(II) as shown by reaction II:

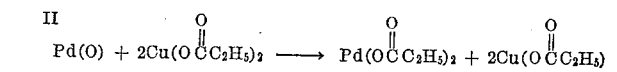

Cu(I) may be periodically regenerated to Cu(II) by addition of oxygen as shown in reaction III:

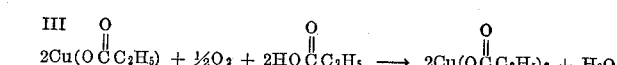

The overall reaction is illustrated by equation IV:

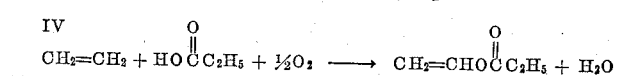

It has been discovered that lithium and/or sodium propionate significantly enhance the rate of reaction IV above as well as the overall productivity of the ester. The manner by which these salts achieve such beneficial results is not clearly understood. It is thought that these salts assist in the abstraction of protons from the organopalladium species and/or stabilize one or a plurality of the inorganic species comprising the catalyst and is co-oxidant.

It has been found, surprisingly, that not all alkali metal salts of propionic acid beneficially effect the production of esters of propionic acid in the process of this invention. Particularly, it has been found that the presence of potassium salts of propionic acid actually deleteriously affect not only the rate of production, but the overall productivity of the process. For example, it has been observed that a small amount of potassium salt, e.g., 1 percent basis weight of co-oxidant, significantly diminishes the amount of co-oxidant in the reaction environment. This is disadvantageous since the productivity of the esters of propionic acid is directly related to the concentration of Cu(II) co-oxidant in the liquid mixture.

To illustrate the effectiveness of the process of this invention, recourse is made to the following example in which ethylene and propionic acid react to produce vinyl propionate. In this example, palladium dipropionate is the catalyst and cupric propionate is the co-oxidant.

EXAMPLE I

There were added 24 grams of cupric propionate, 12 grams of lithium propionate, and 100 grams of propionic acid to a 1-liter, 4-necked, round-bottom flask fitted with thermometer, condenser, heating mantle, gas inlet port, self-sealing rubber septum, and a high speed stirrer operated at 12,000 to 14,000 revolutions per minute. The mixture formed a solution when heated with stirring to 100° C. under one atmosphere of ethylene. To the solution was added 0.253 gram of palladium dipropionate dissolved in 5 grams of propionic acid. The heat and stirring was maintained and samples of the reaction mixture were removed periodically for analysis of copper(II). The following table indicates the percent of copper(II), basis amount of copper(II) originally charged as cupric propionate, in the solution during the course of the reaction:

Table

| Time (in minutes): | Percent copper (II) remaining |
|---|---|
| 0 | 101.5 |
| 10 | 94 |
| 45 | 89 |
| 60 | 84 |
| 90 | 77 |
| 120 | 75.4 |
| 180 | 75.6 |

The fact that Cu(II) was consumed indicated the production of vinyl propionate since the consumption of Cu(II) is directly related to the production of vinyl propionate. The production of vinyl propionate was demonstrated by separate analysis for vinyl propionate.

In experiments conducted similarly to Example I where no lithium propionate or other alkali metal propionate was added, there was no indication of reaction as evidenced by either copper(II) or vinyl propionate analysis even after two hours in one case, and evidence of only a stoichiometric reaction with Pd(II) in another.

Example I illustrates some very significant points regarding the addition of lithium and sodium propionate in the production of the desired esters. In the case of the reaction between ethylene and propionic acid it is normally necessary, in the absence of the desirable lithium and sodium salts, to maintain ethylene over the solution under considerable pressure. Only in this fashion is it generally possible to introduce sufficient ethylene in the solution to achieve significant productivities. However, by providing the sodium and/or lithium propionates in the catalyst solution it is possible to effect significant vinyl propionate production even when the ethylene is at atmospheric pressure. This would tend to indicate that these desirable salts synergize, in some manner, the activity of the catalyst and co-oxidant so that they are capable of effecting vinyl propionate production even without an appreciable quantity of ethylene in the solution.

As indicated previously, the preferred process of this invention involves principally the liquid intermixture of propionic acid, an olefinically unsaturated hydrocarbon (particularly an olefin), a precious metal containing catalyst, a co-oxidant which is copper(II) compound, and sodium propionate, lithium propionate or mixtures of both. Preferably, the intermixture is a homogeneous liquid phase medium.

A preferential aspect of this invention resides in effecting the process in the essential absence from the intermixture of strong mineral acids and other strong acids which have an ionization constant greater than $5 \times 10^{-3}$ in water at 25° C. Moreover, the aforementioned intermixture is maintained essentially free of halogen thereby precluding the formation of unwanted by-products and the need for halogen-resistant apparatus.

It is to be appreciated that the process of this invention is not sensitive to the presence of halogen, insofar as the overall function of the process in producing the desired ester is not altered. On the other hand, the presence of appreciable halogen creates numerous difficulties, and for this reason, the reaction mixture should be essentially free of halogen, i.e., the halogen content of the intermixture should be less than fifty parts per million, preferably below 25 parts per million, basis weight of the aforementioned mixture.

Moreover, the process of this invention does not preclude the presence of substantial amounts of anions of strong mineral acids other than hydrohalic acids so long as they are present as neutral salts, such as sodium sulfate, sodium nitrate, and the like.

The catalyst of the process of this invention is a precious metal of the transition series in oxidized form and is either complexed with a non-olefinic compound or is a salt of a weak acid such as an acid having an ionization constant not greater than $5 \times 10^{-3}$, determined in water at 25° C. When the catalyst is in the intermixture it typically is thought to be a metal complex even though it is provided as a salt of the defined acid. Therefore, the acid anions are considered ligands and the resulting catalyst may be classed as a salt or complex when provided in the intermixture. Illustrative of desirable precious metals are, e.g., palladium, platinum, iridium, rhodium, ruthenium, osmium and gold. Because of its relatively low cost and its superior catalytic behavior, palladium is particularly preferred.

The anion of the catalyst may be derived from an inorganic acid such as sodium dihydrogen phosphate, disodium hydrogen phosphate, or other alkali metal salts of hydrogen phosphates, arsenious acid, sodium dihydrogen arsenate, and the like. Desirably, the salt is of an organic carboxylic acid such as the following monocarboxylic acids: saturated fatty acids of up to 18 carbon atoms, e.g., formic acid, acetic acid, propionic acid, n-butanoic acid, n-pentanoic acid, 2-ethylhexanoic acid, 2-carboxybutane, and the like; the cycloalkylcarboxylic acids such as cyclohexylcarboxylic acid, cyclopentylcarboxylic acid, and the like; and the aromatic containing carboxylic acids, such as benzoic acid, naphthoic acid, phenylacetic acid, and the like. The carboxylic acid should be free of non-benzenoid carbon to carbon unsaturation. Alkanoic acids of from 1 to 10 carbon atoms and cycloalkanoic acids of 5 to 6 carbon atoms in the ring are preferred. Significantly desirable are the saturated fatty acids of from 1 to 4 carbon atoms, such as formic, acetic, propionic, and butyric acids, with propionic acid the most desirable of the class.

The catalyst may also be utilized in the oxidation state as a coordinate complex, i.e., the metal may be complexed with one of a plurality of ligands, such as β-dicarbonyl ketones and esters, e.g., acetylacetone, malonic acid esters, and methylacetoacetate; β-ketonitriles, e.g., acetoacetonitrile; and the like complexing agents. The complexing agents are preferably organic and typically possess ionization constants appreciably lower than that of the weak acid.

The performance of the catalyst is dependent, in some cases, upon the chosen ligand. Moreover, other process variables such as the olefin to be oxidized, solvents, water concentration, temperature, and the like, tend to govern the performance level of the catalyst. Thus, each metal may require a favorable environment for its use in the present invention.

In view of the preference for salts or complexes of palladium, the remaining discussion of this invention is specific to their use. It is to be understood that other metals within the above standards may be substituted for palladium and utilized in accordance with the discussion herein.

The co-oxidant of this invention is a copper(II) compound, which may be in the form of a salt or complex, preferably as a salt of the aforementioned weak acids, to wit, and acid having an ionization constant of not greater than $5 \times 10^{-3}$, or as a complex of the aforementioned complexing agents listed for the catalyst.

The olefinically unsaturated compounds contemplated as reagents in this process contain at least one ethylenic group, i.e., $>C=C<$, and are free from acetylenic unsaturation. They also contain at least one free hydrogen atom on each carbon atom of at least one ethylenic group therein. Olefinic compounds, particularly desirable in this process are olefinically unsaturated hydrocarbons which may be characterized by the following formula:

(I)    RHC=CHR wherein each R can be either hydrogen or a monovalent hydrocarbon radical free of acetylenic unsaturation, e.g., alkyl, cycloalkyl, alkenyl, cycloalkenyl, aryl, aralkyl, alkaryl, and the like. In addition both R's together with the ethylenic carbon atoms of Formula I, supra, may represent a cycloaliphatic hydrocarbon nucleus containing from 5 to 12 carbon atoms, preferably from 5 to 8 carbon atoms. Illustrative are cyclopentene, cyclohexene, cycloheptene, cyclooctene, cyclododecene, their alkyl and aryl derivatives, and the like. Particularly preferred are the olefins.

Illustrations of R include hydrogen, methyl, ethyl, n-propyl, isopropyl, n-butyl, isobutyl, sec-butyl, the pentyls, the hexyls, the heptyls, the octyls, the dodecyls, the octadecyls, vinyl, allyl, 1-propenyl, 1-butenyl, 2-butenyl, 3-butenyl, the hexenyls, the octenyls, the cyclopentyl, cyclohexyl, cycloheptyl, cyclohexenyl, phenyl, tolyl, xylyl, ethylphenyl, propylphenyl, benzyl, phenylethyl, phenylpropyl, phenylbutyl, and the like. Illustrative olefinic compounds include, ethylene, propylene, 1-butene, 2-butene, 1-pentene, 2-pentene, 1-hexene, 2-hexene, 3-hexene, 1-heptene, 2-heptene, 3-heptene, the octenes, the decenes, the dodecenes, the octadecenes, cyclopentene, cyclohexene, cycloheptene, cyclooctene, cyclododecene, lower alkyl (1 to 4 carbon atoms) substituted cyclopentene, lower alkyl (1 to 4 carbon atoms) substituted cyclohexene, lower alkyl (1 to 4 carbon atoms) substituted cycloheptene, butadiene, 1,3-pentadiene, isoprene, 1,3-hexadiene, 1,5-hexadiene, the heptadienes, 1,7-octadiene, the dodecadienes, 4-vinylcyclohexene, vinylcyclohexene, allylcyclohexene, vinylcyclopentane, styrene, 3-phenyl-1-propene, 4-phenyl-1-butene, bicyclo[4.3.0]nona-3,7-diene, the methyl substituted styrenes, the ethyl substituted styrenes, and the like.

Preferred olefinic compounds include the alkenes, especially those which have from 2 to 8 carbon atoms; the alkadienes, especially those which have from 4 to 8 carbon atoms; the cycloalkenes, especially those which have from 5 to 6 carbon atoms in the cycloalkenyl nucleus; the vinylcycloalkenes, especially those which have from 5 to 6 carbon atoms in the cycloalkyl nucleus; the α-alkenylbenzenes, especially those which have from 2 to 4 carbon atoms in the α-alkenyl moiety thereof; and the like. Highly preferred olefinic compounds include, ethylene, propylene, 1-butene, butadiene, isoprene, cyclohexene, 4-vinylcyclohexene, and styrene. Ethylene is most preferred.

A favorable embodiment of this invention resides in the periodic regeneration of the copper co-oxidant as indicated in reaction III above. Thus, the reduced copper co-oxidant, i.e., Cu(I), is converted to the Cu(II) state by introducing oxygen to the reduced co-oxidant. This may be effected in the liquid intermixture during formation of alkenyl propionate or in a separate stage of the process.

The oxidizing agent employable in this process may be oxygen, per se, or in admixture with other gases such as in the case of air. The oxidizing agent may also be a compound capable of releasing oxygen in the oxidation and reduction reaction, such as the peroxides, e.g., peracetic acid hydrogen peroxide, oxides of nitrogen, and the like. The oxidizing agent causes the reoxidation of copper to its higher oxidized state, i.e., cupric; and thus the amount of oxygen in the process should be sufficient to effect this result.

The process of this invention involves simply mixing all the aforementioned ingredients in a reaction zone suitable for the incorporation of all of them. It is not mandatory to incorporate the oxidizing agent in the zone where conversion of, e.g., the olefin to propionate is effected. Thus, when the preferred alkenyl propionate is being produced, the reaction zone should contain as important ingredients, an olefin, propionic acid, the catalyst, the co-oxidant, and lithium and/or sodium propionate.

As noted previously, the productivity of propionate by the process of this invention is directly related to the concentration of Cu(II) co-oxidant in the liquid mixture. That is to say, as the concentration of the Cu(II) co-oxidant is increased in the liquid intermixture, the productivity of alkenyl propionate is significantly increased. For example, as the amount of Cu(II) co-oxidant in the liquid mixture is increased, the concentration of alkenyl propionate which can be obtained per pass is commensurately increased. As a result, fewer product removal cycles are needed, thereby greatly reducing the cost of operation, e.g., by reducing wear on equipment and by reducing the frequency of oxidation of Cu(I) with oxygen.

Moreover, in a heretofore normal operation, i.e., in the absence of any lithium and sodium propionate salt, the amount of Cu(II) which can be provided in the solution in a homogeneous liquid phase system is limited by its conventional solubility. However, it has been surprisingly found that any amount of sodium and/or lithium propionate which is added to the homogeneous liquid mixture is capable of increasing the amount of Cu(II) in the solution over that which is obtainable in the absence of said salts. As a result, it is possible to provide an amount of copper considerably in excess of that which is obtainable in the heretofore normal operation, i.e., in the absence of the preferred sodium and/or lithium propionate salts.

Therefore, a significant and preferred manner of carrying out the process of the instant invention resides in maintaining sufficient sodium and/or lithium propionate in solution to provide in the solution an amount of copper co-oxidant in excess of that which is obtainable in the solution in the absence of said lithium and/or sodium propionate. Conversely, and more specifically, it is a significant embodiment of this invention to maintain a homogeneous liquid mixture, as described above, wherein the Cu(II) content is in excess of that which is obtainable in said liquid mixture in the absence of said lithium and/or sodium propionate. This allows for operation of the process of this invention so as to obtain the aforementioned benefits accruing from high copper concentration.

The amount of sodium salt and lithium salt usable to achieve this result may be from trace amounts up to molar ratios of said sodium and/or lithium salt to copper of from 5 to 1, and greater. As a result, it is possible to increase the weight concentration of copper in the solution in amounts ranging up to and in excess of 200 weight percent over the concentration obtainable in the absence of said lithium and sodium salts.

The process may be conducted over wide temperature and pressure ranges. The selection of the pressure and temperature for optimum results will depend upon various factors such as the nature of the olefinic reagent, catalyst and co-oxidant, the concentration of the components in the reaction, the use of solvents and/or diluents, equipment employed, and the like.

The reaction temperature typically ranges between 0° C. and 250° C., though lower and higher temperatures may be found suitable. A particularly suitable temperature range is from about 20° C. to about 200° C. In general, the reaction proceeds more favorably at elevated temperatures. A reaction temperature in the range of from about 50 to about 160° C. is preferred. It has been observed that significant results are obtained at 80° C. to 130° C.

The reaction may be effected for a period of time ranging from seconds to several hours depending upon the correlation of factors embodying the operation of this process. For example, the reaction can be completed in less than one second or in up to 10 hours or longer.

As indicated previously, the process of this invention is effective in a liquid mixture of solvent, catalyst, co-oxidant and sodium and/or lithium propionate. Liquid mixture includes a homogeneous liquid phase, such as, a solution of the aforementioned ingredients. This requires the presence of at least one liquid substance, such as a solvent, at the temperature of operation of the process. A most desirable liquid substance which acts as a solvent in the instant process, as well as an important component of the process, is propionic acid. However, the reaction may be conducted in the presence of other materials which perform the function of a solvent.

Such other materials are liquids at the reaction temperature and may be utilized as a solvent or diluent in conjunction with propionic acid. Such materials are classed as inert, liquid, organic vehicles such as hydrocarbon nitriles, e.g., acetonitrile, propionitrile, benzonitrile, and the like; the dialkyl sulfoxides, e.g., dimethyl sulfoxide, and the like; the cyclic sulfoxides, e.g., tetrahydrothiophene-1-oxide, and the like; the dialkyl sulfones, e.g., dimethyl sulfone, and the like; the N,N-dialkylcarboxamides, e.g., N, N-dimethylacetamide, N,N-dimethylformamide, and the like; the cyclic sulfones, e.g., sulfolane, and the like; the dialkyl and cyclic carbonates, e.g., diethyl carbonate, ethylene carbonate, and the like; the aliphatic and cyclic ethers, e.g., tetrahydrofuran, dioxane, dimethyl ether of diethylene glycol, dimethyl ether of triethylene glycol, and the like; beta-diketones, e.g., 2,4-pentanedione; beta-ketoesters, e.g., acetoacetic acid esters (e.g., methyl ester) and malonic acid esters (dimethyl malonate); ketodioxane, and the like. Any liquid material which is inert to the reaction and is a solvent for propionic acid, the Pd(II) catalyst, the Cu(II) co-oxidant, and preferably the alkali metal propionates may be employed in the process of this invention.

It is desirable to operate the process in the essential absence of impurities which tend to inactivate the catalyst and co-oxidant. It is particularly desirable to employ an essentially anhydrous feed mixture. It is preferred that the liquid mixture is maintained essentially anhydrous. For instance, particularly desirable results are obtained utilizing a liquid mixture containing less than one weight percent water, basis weight of liquid mixture.

The catalyst, for example a complex or salt of palladium in the divalent oxidation state, is present in amounts sufficient to catalytically induce the reaction. When the process is effected in the homogeneous liquid phase, a suitable catalyst concentration may be within a range of from about $1 \times 10^{-6}$ weight percent, and lower, to about 5 weight percent and higher, calculated as palladium metal, based on the total weight of liquids employed in the reaction. A preferred catalyst concentration calculated as palladium metal is of the order of about 0.000001 to about 1.5 weight percent, based upon the weight of liquid mixture. The character of the reagents, the operative conditions under which the reaction is conducted, the solvent characteristics, and other factors will determine the catalyst concentration necessary for optimum results. The composition of the catalyst compound selected is determined in part on the basis of solubility. Whether the catalyst contains palladium(II) as a salt or in a complex form depends upon whether it is readily soluble in the reaction medium or whether it can become soluble therein by reaction with one of the components of the medium. Thus, the catalyst charged may be a compound of palladium other than the desired salt or complex form since transformation can occur after incorporation into the medium.

The divalent state of palladium as indicated by the equations above, exerts the alkenylation. The aforementioned salts or complex forms employable as a source of palladium(II) include palladous alkanoates of the aforementioned monocarboxylic acids, e.g., palladous formate, palladous acetate, palladous propionate, palladous butyrate, palladous hexanoate, palladous cyclohexanecarboxylate, and the like, coordinate complexes of palladium with ligands such as described above and illustrated by Pd(II) acetylacetonate, Pd(II) dimethyl malonate, and the like. In addition, palladium metal which can be oxidized by a suitable co-oxidant in the reaction medium to Pd(II), and thus form either a salt or a complex product by virtue of the presence in the solution of carboxylic acid anions or the complexing agents, may be employed.

The reaction is typically effected in the presence of sufficient oxygen to essentially prevent the deposition of metal which results from the reduction of the catalystic cation, for example, to essentially prevent the deposition of Pd(0) resulting from the reduction of Pd(II). In other words, the reaction is conducted with sufficient oxygen incorporated therein to maintain the ratio of the co-oxidant in its higher oxidation state relative to its lower oxidation state, e.g., Cu(II)/Cu(I), at a level such that the Cu(II)/Cu(I) couple is capable of converting Pd(0) to Pd(II) at a rate which maintains a catalytically sufficient concentration of Pd(II) in solution and which essentially prevents appreciable deposition of Pd(0).

Oxygen requirements are determined from periodic analyses of samples of the reaction product mixture for Cu(II). As a practical matter, the concentration of oxygen in the reaction mixture required to maintain a Cu(II) level is a function of the operative temperature, pressure, and the like. When an oxidizing agent is employed which releases elemental oxygen, such as peroxide, temperature becomes a critical factor. Of course, factors such as residence time, the equipment used, safety factors to be observed, and the like, may impose practical considerations which determine the optimum conditions. For example, should ethylene be the olefinic reagent, caution should be exercised in recovery of the unreacted ethylene to avoid build-up of a potentially explosive oxygen-ethylene mixture.

This latter feature invokes need for careful operation since it is significantly desirable to use an oxygen-rich gas in effecting the reaction. For obvious economic and commercial reasons, a substantially pure oxygen feed, e.g., a gas containing at least 90 volume percent oxygen, is preferred. The introduction of substantially pure oxygen (e.g., at least 99 percent by volume pure) into the system significantly insures a more intimate contact of oxygen with the co-oxidant. Thus, as stated previously, the oxygen may be utilized as pure molecular oxygen ($O_2$), oxygen in admixture with inert gases such as in the case or air, or elemental oxygen derived by the decomposition of organic and inorganic compounds, such as peracetic acid, in the case of peroxides, and $N_2O_4$, in the case of oxides of nitrogen.

The concentration of the co-oxidant in the reaction is variable over a wide range. For example, the molar ratio of Cu(II) or Pd(II) can vary from about 0.5 and upwards to several thousand or more. It is desirable to employ a molar ratio of Cu(II) to Pd(II) of greater than one and preferably significantly greater than one, e.g., greater than 10 and upwards to 60,000 and higher. Of course, the maximum obtainable concentration of Cu(II) relative to Pd(II) is dependent upon the operating conditions and the amount of Li and/or Na propionate employed. It is to be appreciated that the instant invention finds favor in a high molar ratio of Cu(II) to Pd(II).

The selection of the particular co-oxidant, whether provided in salt or complex form, is dependent upon its solubility in the reaction mixture. Of course, copper compounds which are capable of converting to the aforementioned salts or complexes may be employed. Illustrative of these is cupric oxide which in the reaction medium reacts with the acid anions or complexing agents to form the co-oxidant. A minimum amount of experimentation will determine the exact reactants desirable under the conditions of operation, particularly if recourse is made to the teachings herein.

The solubility of the aforementioned olefinically unsaturated compound in the reaction mixture depends to a substantial extent upon many variables. For example, in the case of a homogeneous liquid phase reaction, the solubility of the olefinic compound in the liquid is dependent upon its character, i.e., whether it is a liquid or gaseous compound at operating temperatures. Of course, a liquid compound is easily incorporated in the liquid phase and the extent of incorporation is dependent upon the solvent employed, e.g., whether the solvent is only propionic acid or is a mixture of propionic acid and an inert liquid organic compound. In the case where the olefinic compound is gaseous at operating conditions, its solubility under operative conditions of the reaction is proportional to the pressure, or differently expressed, the partial pressure of the olefinic compound above the liquid reaction mixture will directly affect the amount of the compound incorporated in the reaction mixture and hence, to a large degree, the amount of ester of propionic acid obtainable.

In general, an amount of the olefinic compound at least sufficient to maintain substantially all of the Pd(II) in the form of a π-complex is desirable, though a lesser amount of the olefin may be employed with the consequent disadvantage of lower reaction rates and reduced productivities of alkenyl propionate product. Usually there is employed at least one mole of olefin in the reaction mixture for each mole of palladium therein. The practical upper limit of the concentration of olefinic compound is that which measurably decreases the solubility of inorganic components, e.g., the co-oxidant of the reaction mixture, in the aforedefined liquid intermixture.

When a homogeneous liquid phase reaction is employed using the aforementioned components in a solvent medium, the solvent employed should be sufficient to maintain reasonable dissolution of the Pd(II) and Cu(II) components in amounts sufficient to give desired yields.

Usually, propionic acid present in the liquid mixture is at least equimolar to the amount of olefin incorporated in the mixture. When propionic acid is also employed as a solvent, alone or with other solvents, then it is desirably provided in amounts at least double the molar quantity of olefin incorporated in the liquid mixture.

This process can be effected in a batch, semicontinuous or continuous manner. Equipment can be fabricated of glass, metals such as stainless steel, nickel, alloys thereof, and other conventionally employed materials to best suit the particular needs of the contemplated operative conditions.

One suitable manner for effecting the reaction is to first prepare a liquid mixture of Cu(II) co-oxidant, sodium and/or lithium propionate, propionic acid, alone or in admixture with additional solvent, and catalyst, e.g., Pd(II). Under the desired operative conditions of temperature and pressure, the olefinic compound, e.g., ethylene, and oxygen can be introduced as an admixture or separately and simultaneously or separately in stages into the homogeneous liquid phase reaction medium. The vinyl propionate can be periodically removed from the reaction zone. The product is recoverable by conventional procedures well known in the art. Water removal is effected in amounts sufficient to avoid excess build-up of water.

The reaction may also be effected utilizing the inert, liquid organic solvents described above. These organic solvents are typically polar compounds which are capable of enhancing the solubility of the metal salts or complexes in the homogeneous liquid reaction mixture, particularly in the case of the Cu(II) salt or complex. These solvents are inert with respect to the reagents and products produced.

The process of this invention is adaptable to many procedures for commercial utilization, and one which is preferred involves a two-step operation. In the first step the alkenylation reaction is effected. In the second step the copper(I) component is re-oxidized prior to re-introduction into the alkenylation reaction zone. This two-step process is essentially a cyclic process involving the continuous production of alkenyl propionate and the continuous regeneration of the Cu(II) co-oxidant outside of the alkenylation reaction zone. In the reaction step, the olefinic compound is contacted with the catalyst and the co-oxidant in the presence of propionic acid (with or without the inert, liquid organic solvent), and sodium and/or lithium propionate under the conditions noted previously to produce the alkenyl propionate. It is desirable first to prepare a homogeneous liquid phase containing the solvent (e.g., propionic acid, alone or admixed with other solvent), the catalyst, the co-oxidant, and the lithium and/or sodium propionate, and then to contact this homogeneous liquid phase with the olefinic compound. Thereafter, the olefinic ester of propionic acid, as well as unreacted olefinic compound (if present) are recovered from the reaction product mixture via conventional techniques, e.g., distillation. The remainder or residue, which typically contains some co-oxidant in the lower oxidation state, e.g., Cu(I), is contacted with sufficient oxygen to convert Cu(I) to Cu(II), i.e., from a lower state of oxidation to a higher state of oxidation. Purging of excessive amounts of ingredients may be effected by distillation or by withdrawing a side stream of the regenerated mixture. For example, the water formed in the reaction is advantageously removed at this time. Make-up reagents may be added at this time to the mixture. The mixture is then recycled to the reaction step. Another liquid organic solvent, such as described previously, may be employed in the reaction step and/or regeneration step as is found necessary.

The process may also be effected in a countercurrent homogeneous liquid phase operation. In this type of operation, propionic acid with or without other solvents, the catalyst, co-oxidant, and sodium and/or lithium salts may be fed to the top of a column and the olefin may be fed to the bottom of the column. The catalyst may be regenerated at any one of the stages of the column by feeding oxygen with the olefin or it may be regenerated outside of the column. To increase contact between the reactants, the components within the column may be dispersed and/or or agitated. This may be effected, e.g., through use of a rotating disc column (RDC).

To further illustrate the present invention in addition to preceding Example I, there is hereinafter provided examples to which the instant invention is not limited.

EXAMPLE II

To a three-liter glass bomb equipped with a 55/50 standard taper joint, a thermocouple well, and a gas vent were charged 80 grams of copper(II) propionate, 64 grams of sodium propionate, 2.24 grams of palladium acetate and 200 grams of propionic acid. At 100° C., about 24 grams of Cu(II) propionate (30 weight percent of the amount charged) can be dissolved in 100 grams of propionic acid in the absence of sodium and/or lithium propionate. The charged liner was sealed in a stainless steel high pressure bomb, and the system was purged with nitrogen. The bomb and its contents were then heated to 102° C. At this temperature the above mixture completely forms a solution. With continued rocking, ethylene was charged to the bomb to 500 pounds per square inch (p.s.i.). After one hour, the pressure had dropped to 433 p.s.i. The bomb was cooled to 38° C. before venting.

The reaction mixture was analyzed by vapor phase chromatography and was found to contain 17.4 grams of vinyl propionate (91 percent of theoretical).

The vinyl propionate was removed from the reaction mixture by distillation. After distillation, the reaction mixture was transferred to the flask and assembly described in Example I. The mixture was heated to 100° C. with rapid stirring and oxygen was passed through the flask. This was continued for 15 minutes. The resulting oxygenated reaction mixture was placed in the aforementioned three-liter bomb liner and was treated as described above to produce additional vinyl propionate.

EXAMPLE III

To a three-liter glass bomb liner fitted with a 55/50 standard taper joint, a thermocouple well, and a gas vent were charged 52 grams of copper propionate, 40 grams of lithium propionate, 2.24 grams of palladium diacetate, and 100 grams of propionic acid. At 100° C. about 24 grams of Cu(II) propionate (about 46 weight percent of the amount charged) can be dissolved in 100 grams of propionic acid in the absence of sodium and/or lithium propionate. The liner and its charge were sealed in a high pressure stainless bomb, purged with nitrogen, then heated with rocking to 101° C. At this temperature, the above mixture completely forms a solution. Ethylene was charged to 500 pounds per square inch (p.s.i.). After continued heating and rocking for one hour, the pressure had dropped to 445 p.s.i. The bomb was cooled to 32° C. and vented. Analysis by vapor phase chromatography indicated the presence of 12.7 grams of vinyl propionate (74 percent of theoretical). After distillation, the reaction mixture was oxygenated as set forth in Example II and thereafter reintroduced to the above three-liter bomb liner and treated as described above with ethylene to produce additional high yields of vinyl propionate.

In like manner, when cyclohexene is used in lieu of ethylene, there is obtained a mixture of cyclohexenyl propionates.

EXAMPLE IV

To a three-liter glass bomb liner fitted with a 55/50 standard taper joint, a thermocouple well, and a gas inlet port were charged a solution at 100° C. and containing 80.5 grams of copper (II) propionate, 28 grams of sodium propionate, 28 grams of lithium propionate, 100 grams of propionic acid, and 0.5 gram of palladium diacetate. At 100° C., about 24 grams of Cu(II) propionate (29.8 weight percent of the amount charged) can be dissolved in 100 grams of propionic acid in the absence of sodium and/or lithium propionate. The bomb liner and its contents were sealed in a steel high pressure bomb, purged with nitrogen, then heated with rocking to 100° C. Ethylene was charged at 500 pounds per square inch, and heating and rocking were continued for 0.5 hour. The bomb was cooled and vented. Analysis of its contents indicated the production of 12.5 grams of vinyl propionate (65 percent of theoretical).

In like manner, when propylene is used in lieu of ethylene there is obtained a mixture of allyl, propenyl, and isopropenyl esters of propionic acid.

Though the above describes various specifics of the present invention, it is not intended that these specifics should limit the scope of the claims unless recited therein.

We claim:
1. A process for the production of olefinically unsaturated organic esters of propionic acid, which comprises providing an essentially anhydrous homogeneous liquid intermixture essentially free of halogen and strong acids having an ionization constant greater than $5 \times 10^{-3}$ in water at 25° C., which intermixture contains propionic acid, an olefinically unsaturated hydrocarbon free of acetylenic unsaturation, a catalyst selected from the group consisting of organic salts and complexes of precious metals, which precious metals are selected from the group consisting of palladium, platinum, iridium, rhodium, ruthenium, and osmium, a Cu(II) co-oxidant for the catalyst, which co-oxidant is a copper (II) compound selected from the class consisting of cupric salts of carboxylic acids free of non-benzenoid carbon to carbon unsaturation having an ionization constant not greater than $5 \times 10^{-3}$ in water at 25° C. and cupric complexes, a salt selected from the group consisting of sodium propionate, lithium propionate and mixtures thereof, and the molar ratio of Cu(II) co-oxidant to catalyst is greater than 10.

2. The process of claim 1 wherein the catalyst is a palladium containing catalyst selected from the group consisting of palladium salts of organic carboxylic acids having an ionization constant not greater than $5 \times 10^{-3}$ in water at 25° C. and palladium organic complexes.

3. The process of claim 1 wherein the ester is recovered from the intermixture and the copper co-oxidant is regenerated in the liquid intermixture with oxygen.

4. The process of claim 3 wherein oxygen is provided to the intermixture after the ester is recovered from the intermixture.

5. A process which comprises providing an olefinically unsaturated hydrocarbon in an essentially halogen-free, essentially anhydrous solution containing propionic acid, a palladium (II) compound selected from the class consisting of Pd(II) salts of organic carboxylic acids having an ionization constant not greater than $5 \times 10^{-3}$ and Pd(II) organic complexes, a copper (II) compound selected from the class consisting of cupric salts of carboxylic acids free of non-benzenoid carbon to carbon unsaturation having an ionization constant not greater than $5 \times 10^{-3}$ in water at 25° C. and cupric complexes, a salt selected from the class consisting of sodium propionate, lithium propionate and mixtures thereof, recovering the olefinically unsaturated hydrocarbon ester of propionic acid as product from the solution and admixing oxygen with said solution, and the molar ratio of copper (II) compound to palladium (II) compound is greater than 10.

6. A process for the production of olefinically unsaturated organic esters of propionic acid, which comprises providing an essentially anhydrous homogeneous liquid intermixture essentially free of halogen and strong acids having an ionization constant greater than $5 \times 10^{-3}$ in water at 25° C., which intermixture contains propionic acid, an olefinically unsaturated hydrocarbon free of acetylenic unsaturation, a catalyst selected from the group consisting of organic salts and complexes of precious metals, which precious metals are selected from the group consisting of palladium, platinum, iridium, rhodium, ruthenium and osmium, a Cu(II) co-oxidant for the catalyst, which co-oxidant is a copper (II) compound selected from the class consisting of cupric salts of carboxylic acids free of non-benzenoid carbon to carbon unsaturation having ionization constant not greater than $5 \times 10^{-3}$ in water at 25° C. and cupric complexes, a salt selected from the group consisting of sodium propionate and mixtures of sodium propionate and lithium propionate, and the molar ratio of Cu(II) co-oxidant to catalyst is greater than 10.

7. The process of claim 6 wherein the salt is sodium propionate.

8. The process of claim 6 wherein the salt is a mixture of sodium propionate and lithium propionate.

References Cited

UNITED STATES PATENTS 3,260,739  7/1966  Schaeffer _____ 260—497

LORRAINE A. WEINBERGER, *Primary Examiner.*

V. GARNER, *Assistant Examiner.*